United States Patent
Vetter et al.

(10) Patent No.: US 10,065,366 B2
(45) Date of Patent: Sep. 4, 2018

(54) FOLDED COMPOSITE FILLER

(71) Applicant: The Boeing Company, Chicago, IL (US)

(72) Inventors: Derek Paul Vetter, Olympia, WA (US); Drew Edward Sommer, West Lafayette, IN (US)

(73) Assignee: The Boeing Company, Chicago, IL (US)

( * ) Notice: Subject to any disclaimer, the term of this patent is extended or adjusted under 35 U.S.C. 154(b) by 225 days.

(21) Appl. No.: 14/287,448

(22) Filed: May 27, 2014

(65) Prior Publication Data

US 2016/0144558 A1     May 26, 2016

(51) Int. Cl.

| | |
|---|---|
| *B29C 53/04* | (2006.01) |
| *B29C 65/00* | (2006.01) |
| *B29C 70/34* | (2006.01) |
| *B29D 99/00* | (2010.01) |
| *B29C 65/48* | (2006.01) |
| *B29C 53/80* | (2006.01) |
| *B29K 105/08* | (2006.01) |
| *B29L 9/00* | (2006.01) |
| *B29L 31/30* | (2006.01) |
| *B64C 1/00* | (2006.01) |

(52) U.S. Cl.
CPC ............ *B29C 66/301* (2013.01); *B29C 53/80* (2013.01); *B29C 65/48* (2013.01); *B29C 66/02241* (2013.01); *B29C 66/03* (2013.01); *B29C 70/34* (2013.01); *B29D 99/0014* (2013.01); *B29C 53/04* (2013.01); *B29K 2105/089* (2013.01); *B29L 2009/00* (2013.01); *B29L 2031/3076* (2013.01); *B64C 2001/0072* (2013.01); *Y02T 50/43* (2013.01)

(58) Field of Classification Search
CPC .. Y10T 156/1075; B29C 53/066; B29C 53/04
USPC .......................................... 156/177, 226, 227
See application file for complete search history.

(56) References Cited

U.S. PATENT DOCUMENTS

| | | | | |
|---|---|---|---|---|
| 4,559,005 A | * | 12/1985 | Gants | B29C 70/504 425/363 |
| 5,795,424 A | * | 8/1998 | Johnson | E04H 12/02 156/166 |

(Continued)

FOREIGN PATENT DOCUMENTS

| | | |
|---|---|---|
| CN | 102548741 A | 7/2012 |
| CN | 102910036 A | 2/2013 |

(Continued)

OTHER PUBLICATIONS

Extended European Search Report, dated Oct. 20, 2015, regarding Application No. EP15169221.7, 6 pages.

(Continued)

*Primary Examiner* — Scott W Dodds
(74) *Attorney, Agent, or Firm* — Yee & Associates, P.C.

(57) ABSTRACT

A method and apparatus for forming a composite filler. A composite ply is folded. The composite ply comprises fibers arranged at an angle relative to a central axis of the composite ply such that the composite filler has a varying cross-sectional orientation of fibers. A force is applied to the folded composite ply after folding to form a desired shape for the composite filler.

20 Claims, 15 Drawing Sheets

(56) References Cited

U.S. PATENT DOCUMENTS

| | | | |
|---|---|---|---|
| 8,163,122 B1 * | 4/2012 | Paul | B29C 70/202 |
| | | | 156/180 |
| 8,440,045 B2 | 5/2013 | Bremmer et al. | |
| 8,714,485 B2 | 5/2014 | Matheson et al. | |
| 2011/0064908 A1 * | 3/2011 | Kweder | B29B 11/16 |
| | | | 428/113 |
| 2011/0139932 A1 * | 6/2011 | Matheson | B64C 3/182 |
| | | | 244/132 |
| 2012/0196083 A1 | 8/2012 | Hanawa et al. | |
| 2014/0034236 A1 | 2/2014 | Guzman et al. | |

FOREIGN PATENT DOCUMENTS

| | | |
|---|---|---|
| EP | 2006074 A1 | 12/2008 |
| JP | 20071299 A | 1/2007 |
| JP | 201184008 A | 4/2011 |
| JP | 2011520690 A | 7/2011 |
| JP | 2013095139 A | 5/2013 |

OTHER PUBLICATIONS

Canadian Search Report, dated Apr. 11, 2016, regarding Application No. 2,882,046, 4 pages.
Canadian Search Report, dated Feb. 23, 2017, regarding Application No. 2,882,046, 4 pages.
Canadian Intellectual Property Office Examination Report, dated Dec. 7, 2017, regarding Application No. 2,882,046, 11 pages.
State Intellectual Property Office of China, First Notification of Office Action, dated May 30, 2018, regarding Application No. 201510107631.8, 9 pages.

* cited by examiner

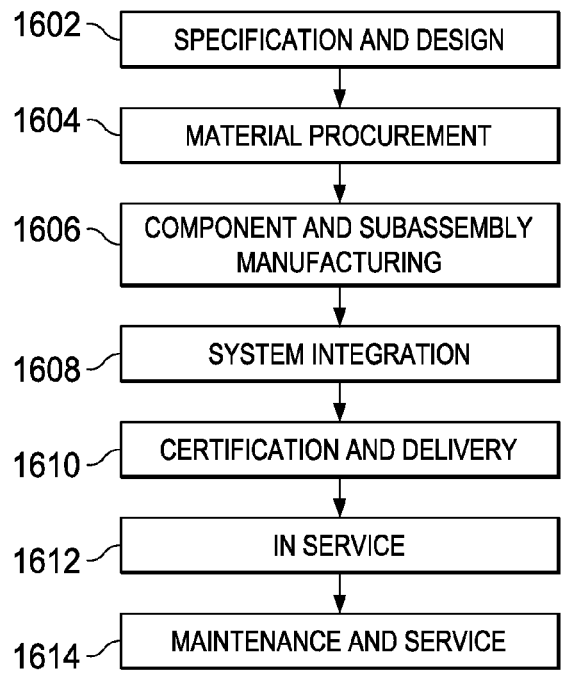
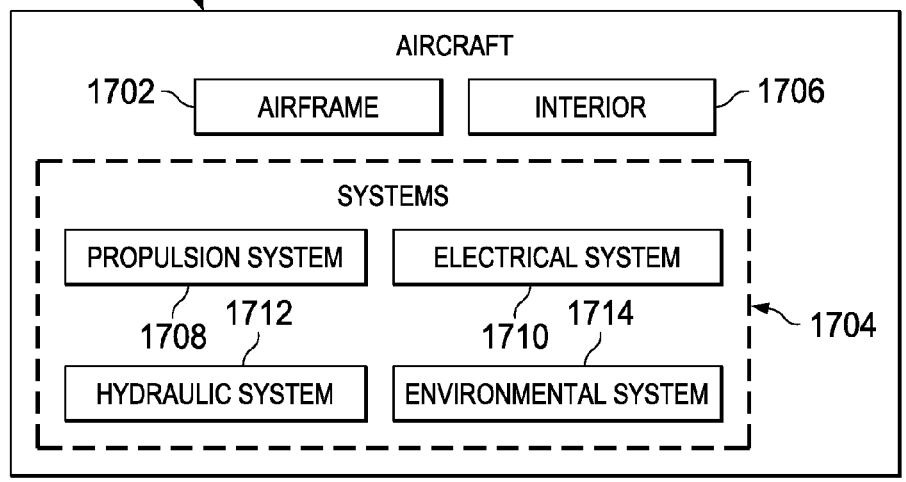

FOLDED COMPOSITE FILLER

BACKGROUND INFORMATION

1. Field

The present disclosure generally relates to composite structures and, in particular, to the formation of composite structures. Still more particularly, the present disclosure relates to a method and apparatus for forming composite fillers used to fill channels between composite structures.

2. Background

Composite materials are tough, lightweight materials created by combining two or more functional components. For example, a composite material may include reinforcing fibers bound in a polymer resin matrix. The fibers may be unidirectional or may take the form of a woven cloth or fabric. In thermoset composites, fibers and resins are arranged and cured to form a composite material.

When composite structural members are joined together, channels or voids may be present along bond lines between the members. These channels may need to be filled in order to increase the strength of the bond. For example, in the aircraft industry, composite fuselage stiffeners may include a filler at the radius bond line between the stiffener and a fuselage skin. For example, a filler may be used at the radius bond line between a stringer and a skin panel.

In some cases, the filler takes the form of triangular cross-sectional structure which fills the voids at the bond line. This triangular cross-sectional structure is sometimes referred to as a "noodle" or a "composite filler."

A composite filler may be formed from composite materials such as adhesive, prepreg tape, fabric, or other types of composite materials. For example, the composite filler may be formed by extruded material, rolled composite material, or stacked strips of composite material. When the composite filler has a desired level of stiffness, the composite filler may transfer some of the load from the stiffener into the base.

During manufacturing and operation of an aircraft, the composite filler may experience various forces. These forces may cause undesired inconsistencies to form within the composite filler. Examples of these undesired inconsistencies may include cracks, delamination, and other inconsistencies. In some cases, the inconsistency may spread from an outer surface of the composite filler through the interior of the composite filler.

If the composite filler includes one of these inconsistencies, the composite filler may not function to transfer loads as desired. Moreover, the composite filler with the inconsistency, as well as the structures bonded to it, may need rework. This rework may cause increased maintenance and service cost for an aircraft, increased manufacturing costs for the composite structures used in the aircraft, or both. Therefore, it would be desirable to have a method and apparatus that take into account at least some of the issues discussed above, as well as other possible issues.

SUMMARY

In one illustrative embodiment, a method for forming a composite filler is provided. A composite ply is folded. The composite ply comprises fibers with an orientation at an angle relative to a central axis of the composite ply such that the composite filler has a varying cross-sectional orientation of fibers. A force is applied to the composite ply after folding to form a desired shape for the composite filler.

In another illustrative embodiment, an apparatus comprises a composite filler including a composite ply having fibers with an orientation at an angle relative to a central axis of the composite ply. The composite ply is folded such that the composite filler has a varying cross-sectional orientation of the fibers.

In yet another illustrative embodiment, a method for forming a composite filler is provided. A composite ply is cut to have desired dimensions. The composite ply is a single ply of composite prepreg tape comprising fibers with an orientation at an angle relative to a central axis of the composite ply. The composite ply is folded such that the composite filler has a varying cross-sectional orientation of the fibers. A force is applied to the composite ply after folding to form a desired shape for the composite filler. The composite filler is positioned in a channel formed by a number of composite structures. The composite filler is then attached to the number of composite structures.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 16 is an illustration of an aircraft manufacturing and service method in the form of a block diagram in accordance with an illustrative embodiment; and FIG. 17 is an illustration of an aircraft in the form of a block diagram in which an illustrative embodiment may be implemented.

DETAILED DESCRIPTION

The illustrative embodiments recognize and take into account one or more considerations. For example, the illustrative embodiments recognize and take into account that some composite fillers used in aircraft are formed from layers of composite material having fibers that are unidirectional with the direction of the fibers running parallel to the central axis of the material. Further, the illustrative embodiments recognize and take into account that these types of composite fillers are relatively easy to manufacture. However, existing uses of unidirectional fibers in composite fillers may increase the occurrence of inconsistencies more than desired. Consequently, these types of composite fillers may not provide a desired level of performance.

The illustrative embodiments also recognize and take into account that a composite filler may be comprised of a stack of plies in which the different plies have bidirectional or multi-axis orientations for the fibers. Although this type of filler may reduce the occurrence of inconsistencies, these ply stacks may be thicker than desired to reduce out of plane stresses. As a result, inconsistencies may still occur more often than desired under various loads experienced by the composite filler.

Thus, the illustrative embodiments provide a method and apparatus for forming a composite filler for use in composite structures. A composite ply is folded. The composite ply comprises fibers with an orientation at an angle relative to a central axis of the composite ply such that the composite filler has a varying cross-sectional orientation of the fibers. A force is applied to the composite ply to form a desired shape for the composite filler.

Figure 1:
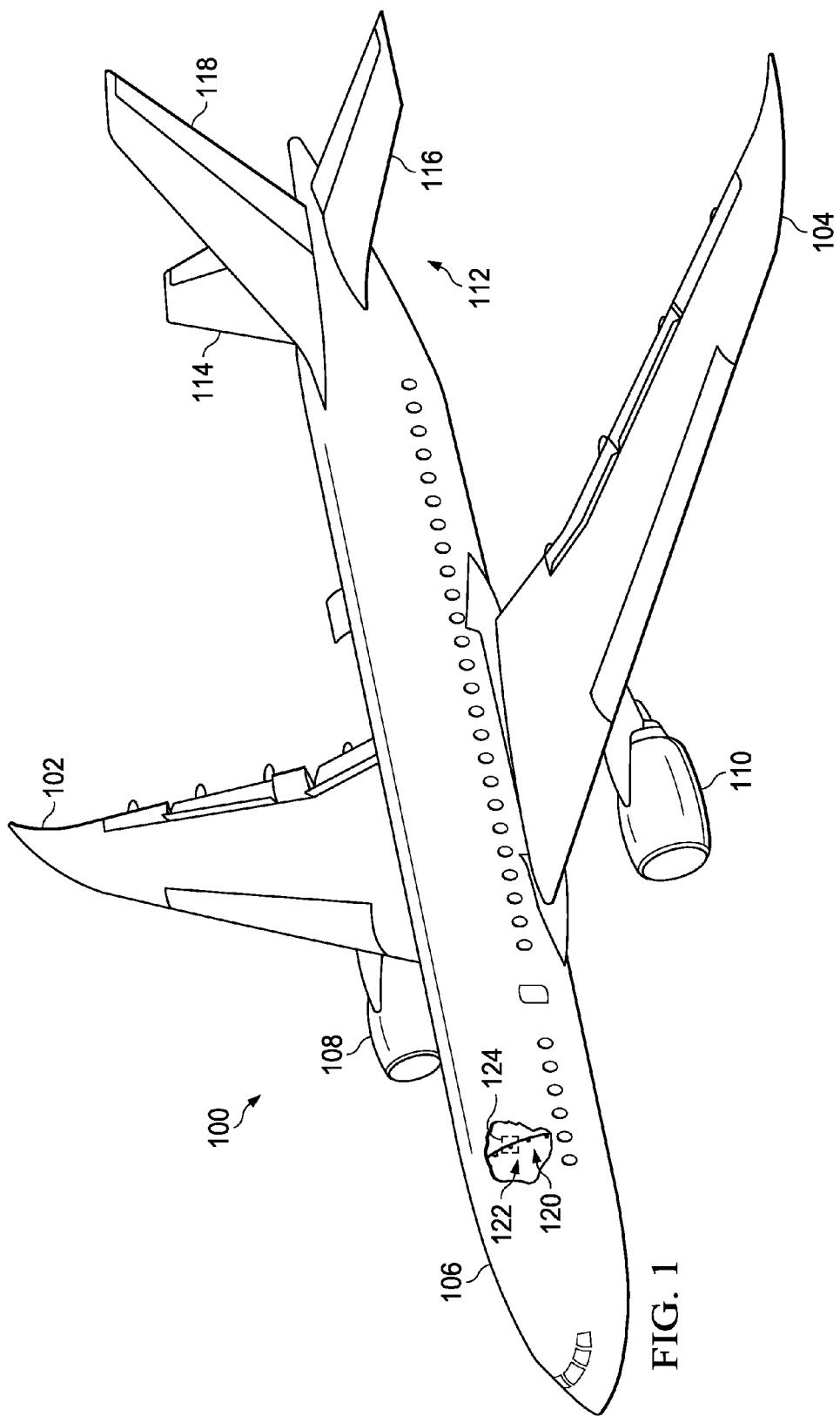
FIG. 1 is an illustration of an aircraft in accordance with an illustrative embodiment.

With reference now to the figures, and in particular, with reference to FIG. 1, an illustration of an aircraft is depicted in accordance with an illustrative embodiment. In this illustrative example, aircraft 100 has wing 102 and wing 104 attached to fuselage 106. Aircraft 100 includes engine 108 attached to wing 102 and engine 110 attached to wing 104.

Fuselage 106 has tail section 112. Horizontal stabilizer 114, horizontal stabilizer 116, and vertical stabilizer 118 are attached to tail section 112 of fuselage 106.

Aircraft 100 is an example of an aircraft in which composite fillers in accordance with an illustrative embodiment may be used. In this illustrative example, composite fillers may be used to fill channels between structures in aircraft 100. For example, an exposed interior view of fuselage 106 is shown with stringers 120. In some illustrative examples, the composite fillers may be referred to as radius fillers, noodles, or composite noodles.

Composite fillers 122 may be located in stringers 120. A portion of stringers 120 with composite fillers 122 is shown in section 124.

Figure 2:
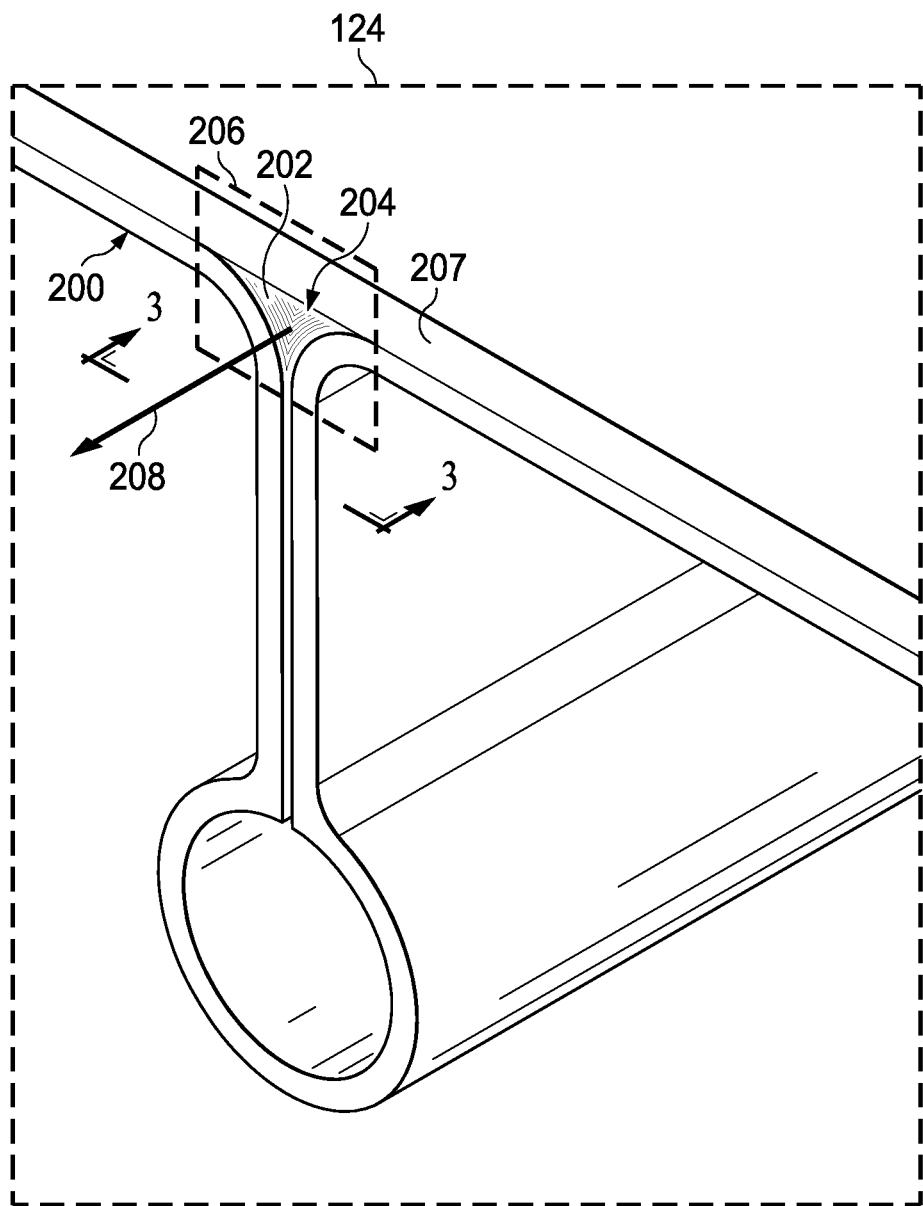
FIG. 2 is an illustration of a more detailed view of a portion of stringers with composite fillers in accordance with an illustrative embodiment.

Turning to FIG. 2, an illustration of a more detailed view of a portion of stringers with composite fillers is depicted in accordance with an illustrative embodiment. In this example, a more detailed illustration of section 124 in FIG. 1 is shown.

In this view of section 124, stringer 200 in stringers 120 in FIG. 1 is seen. Also illustrated in this view is composite filler 202 in composite fillers 122 from FIG. 1.

As depicted, composite filler 202 is located within channel 204 as shown in section 206. Channel 204 is formed by stringer 200 and skin panel 207 in this illustrative example. Channel 204 extends centrally through stringer 200 along axis 208.

Figure 3:
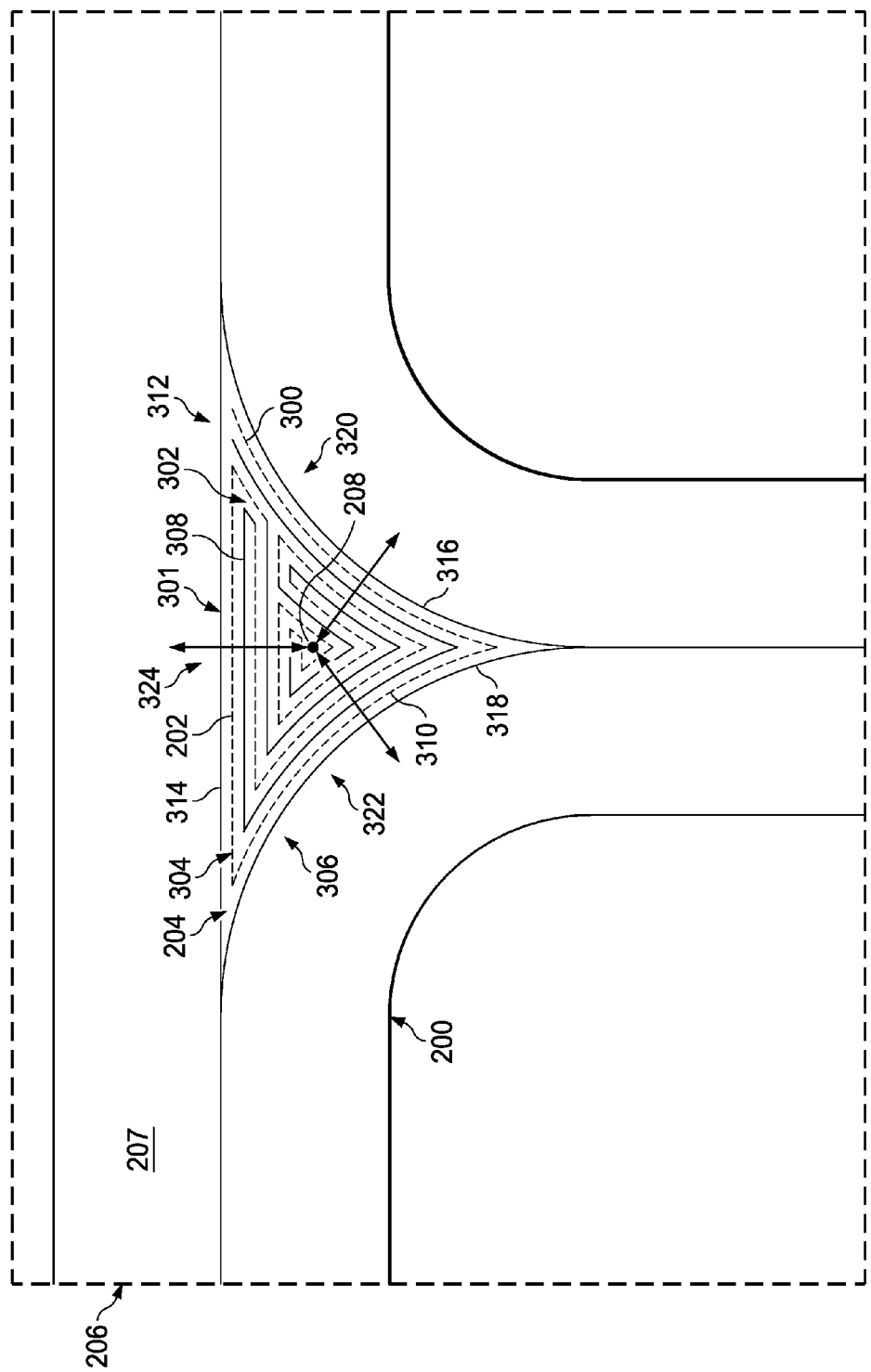
FIG. 3 is an illustration of a more detailed view of a composite filler in accordance with an illustrative embodiment.

Turning next to FIG. 3, an illustration of a more detailed view of a composite filler is depicted in accordance with an illustrative embodiment. In this figure, a more detailed view of composite filler 202 located in channel 204 in stringer 200 in section 206 is shown in the direction of lines 3-3 in FIG. 2.

In this illustrative example, composite filler 202 includes composite ply 300. Composite ply 300 has been folded to form folded composite ply 301 in this illustrative example.

Composite ply 300 may be formed from a single piece of composite material. As an example, composite ply 300 may be formed from a single ply of composite prepreg tape. In other examples, composite ply 300 may be formed from other types of composite materials such as fabrics.

In some cases, composite filler 202 may include a composite ply stack with two or more folded composite plies, depending on the particular implementation. For instance, composite ply 300 may be a first composite ply. A second composite ply may be positioned on top of first composite ply 300, forming a two-ply stack of composite prepreg tape. The stack may then be folded to form composite filler 202.

Figure 5:
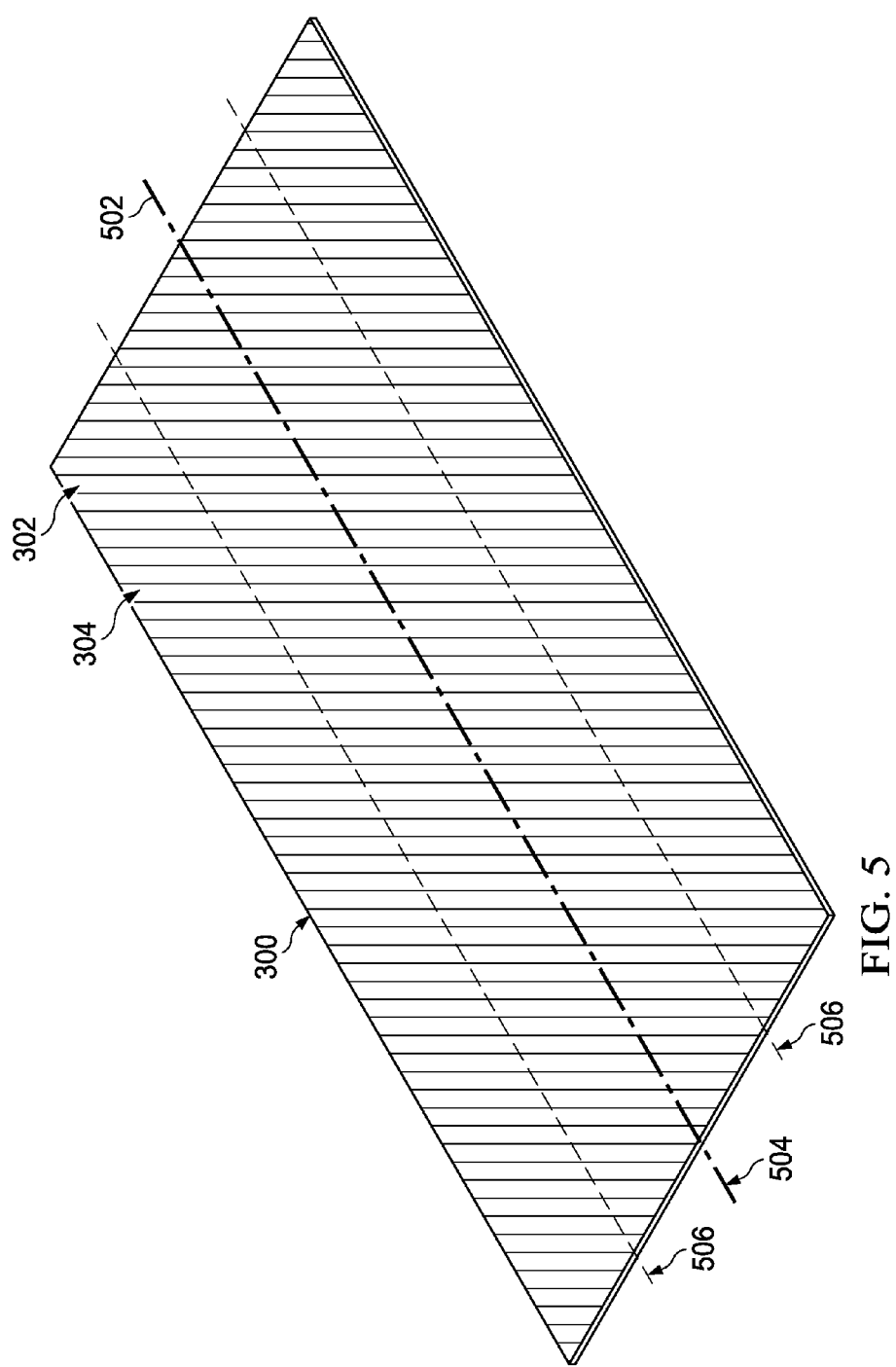
FIG. 5 is an illustration of a composite ply in accordance with an illustrative embodiment.

As illustrated, folded composite ply 300 has fibers 302 and resin 304. Fibers 302 may be have an orientation at an angle relative to central axis (not shown in this view) running longitudinally along composite ply 300. Specifically, fibers 302 may have an orientation selected from one of about +/−10 degrees, about +/−15 degrees, about +/−30 degrees, about +/−45 degrees, about +/−60 degrees, about +/−75 degrees, or other suitable angles. FIG. 5 shows an illustration of fibers 302 having about a −45 degree orientation about a central axis of composite ply 300.

In this view, cross-sectional orientation 306 of fibers 302 in composite filler 202 varies. Cross-sectional orientation 306 of fibers 302 is shown to reflect a bidirectional or "plus-and-minus" orientation of fibers 302 in composite filler 202. This plus-and-minus cross-sectional orientation 306 of fibers 302 occurs by folding a ply with unidirectional fibers to form folded composite ply 301.

Cross-sectional orientation 306 of fibers 302 includes positive ply angle fibers 308 and negative ply angle fibers 310. In this depicted example, the angle of fibers 302 alternates from a positive ply angle to a negative ply angle at about 180 degree turns, or folds, to create cross-sectional orientation 306 having the plus-and-minus orientation of fibers 302.

A plus- and minus cross-sectional orientation 306 of fibers 302 is desirable to increase the structural tolerance of composite filler 202. In this illustrative example, cross-sectional orientation 306 of fibers 302 in composite filler 202 reduces the spread of an inconsistency through composite filler 202. In particular, positive ply angle fibers 308 and negative ply angle fibers 310 reduces the spread of an inconsistency through each layer of folded composite ply 301.

Cross-sectional orientation 306 of fibers 302 also reduces the formation of an inconsistency in composite filler 202.

For example, if an inconsistency takes the form of a crack, positive ply angle fibers 308 and negative ply angle fibers 310 may function as a crack resistor when used in combination with resin 304. Inconsistencies may form from loads applied to stringer 200, skin panel 207, composite filler 202, or a combination thereof in this illustrative example.

As illustrated, some of walls 312 of channel 204 are curved. In this depicted example, walls 312 include wall 314, wall 316, and wall 318. The shape of composite filler 202 fits within channel 204 enclosed by walls 312. Skin panel 207 forms wall 314, while portions of stringer 200 form wall 316 and wall 318.

As depicted, walls 312 define a substantially triangular shape for channel 204. In this example, wall 314 is substantially planar. Wall 316 and wall 318 are curved. Wall 316 has radius 320 and wall 318 has radius 322 in this illustrative example.

Radius 320 in wall 316 and radius 322 in wall 318 make it more difficult to have a desired level of performance when using a currently available composite filler. In the illustrative examples, composite filler 202 provides a desired level of performance as compared to currently used composite fillers because of cross-sectional orientation 306 of fibers 302.

In the illustrative examples, composite filler 202 may be used even when all of walls 312 are substantially planar rather than curved. Composite filler 202 may be manufactured to have a shape that substantially conforms to the shape of walls 312. Further, composite filler 202 also may be used when walls 312 have an irregular surface or shape.

As depicted, composite filler 202 has a cross section with a shape that substantially corresponds to the shape of walls 312 of channel 204. In this illustrative example, composite filler 202 has a cross section with a shape that is substantially triangular.

In other illustrative examples, composite filler 202 may have cross sections that have other shapes. The shape of the cross sections of composite filler 202 depends on the shape of channel 204. For example, the shape may be circular, oval, square, irregular, or some other suitable shape. In some cases, a layer of material (not shown in this view) may be present between composite filler 202 with folded composite ply 301 and at least one of stringer 200 or skin panel 207.

For example, without limitation, a fabric ply may be positioned on the inner surface of channel 204 prior to positioning composite filler 202 in channel 204. In another illustrative example, an adhesive may be placed on the inner surface of channel 204 prior to positioning composite filler 202 in channel 204. In yet another illustrative example, an adhesive may be placed on the outer surface of composite filler 202.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In this illustrative example, the layer of material may be configured to increase adhesion between composite filler 202 and the surrounding structures. The layer of material may be positioned relative to one or more of walls 312 in this illustrative example.

In this depicted example, composite filler 202 experiences high thermal expansion stresses in the direction of arrows 324. These thermal expansion stresses may cause inconsistencies to form in composite filler 202.

Arrows 324 also represent the through thickness of composite filler 202 in any given direction. It may be desirable to reduce the through thickness of composite material in folded composite ply 301 to reduce the out of plane stresses experienced by composite filler 202. In particular, it may be desirable to reduce the thickness of each layer of composite material folded on one another.

When through thickness is reduced, the thermal performance of composite filler 202 is improved. As a result, the risk of inconsistencies forming or spreading within composite filler 202 is reduced or eliminated.

Figure 4:
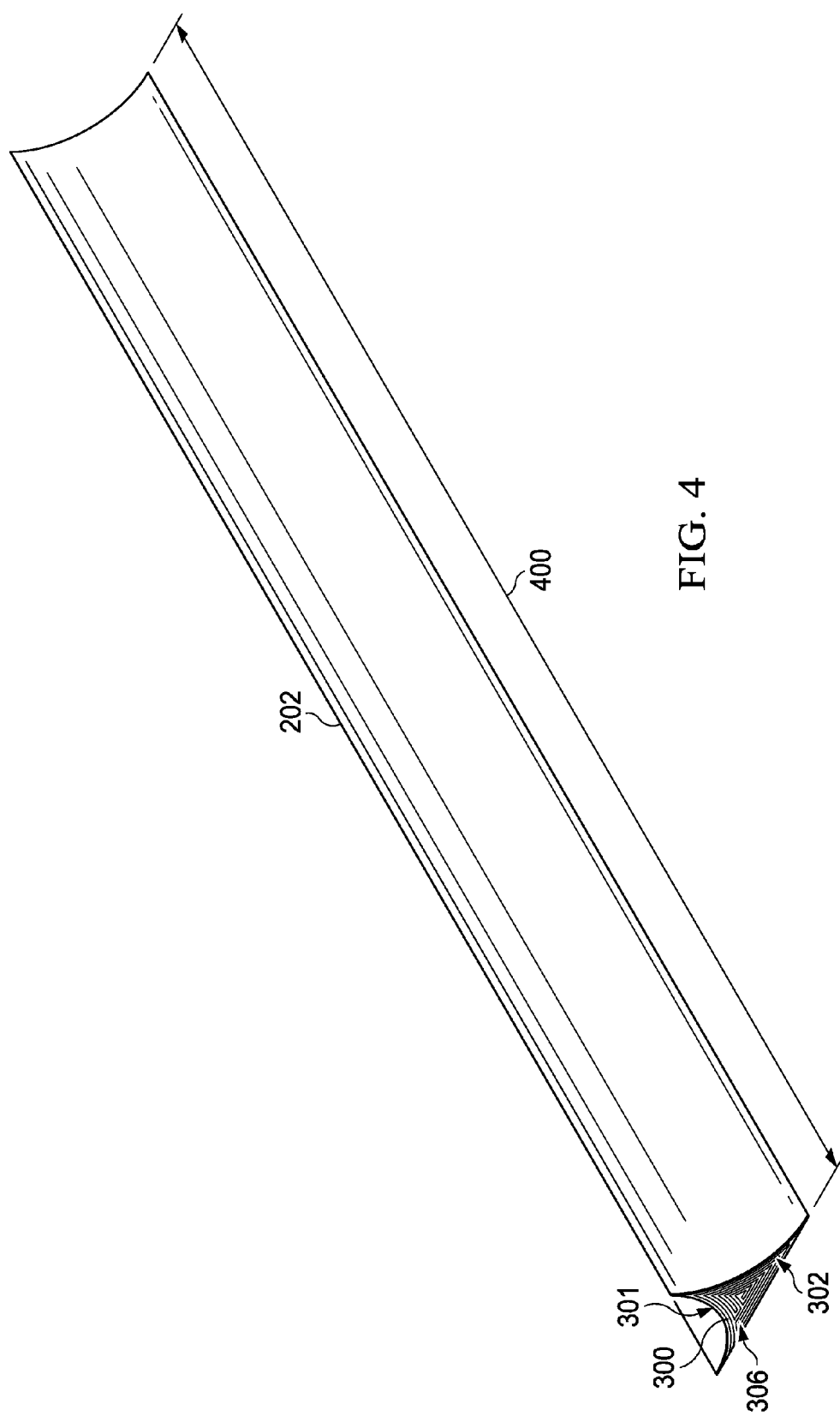
FIG. 4 is an illustration of a perspective view of a composite filler in accordance with an illustrative embodiment.

With reference now to FIG. 4, an illustration of a perspective view of a composite filler is depicted in accordance with an illustrative embodiment. In this figure, composite filler 202 is shown without stringer 200 and skin panel 207 to better illustrate the shape of composite filler 202.

As can be seen in this figure, composite filler 202 has an elongate shape. In the illustrative examples, the three-dimensional shape may take other forms. For example, the three-dimensional shape of composite filler 202 may be curved, saw-toothed, or may have some other suitable shape other than the elongate shape shown in this illustrative example.

In this depicted example, composite filler 202 has length 400. The plus-and-minus orientation of fibers 302 runs along the entirety of length 400 in composite filler 202.

The part in which composite filler 202 is used is a composite part in this illustrative example. In this manner, composite filler 202 is placed in channel 204, shown in FIGS. 2-3, between a number of composite structures. As shown in FIG. 3, stringer 200 and skin panel 207 are both made of composite material.

As used herein, a "number of" items means one or more items. In this illustrative example, a number of composite parts is one or more composite parts.

In other instances, composite filler 202 may be used in other types of parts other than composite parts. Examples of other types of parts may include metal parts, plastic parts, or other suitable types of parts for aircraft 100 shown in FIG. 1.

In FIGS. 5-9, illustrations of a process for manufacturing a composite filler are depicted in accordance with an illustrative embodiment. The manufacturing process illustrated in FIGS. 5-8 is used to form composite filler 202 comprising folded composite ply 301 as shown in FIGS. 3-4.

In the following illustrative examples, a "composite ply" may refer to a piece of composite material prior to being folded. A "folded composite ply" is the composite ply after being folded in a desired manner. A "composite filler" refers to a structure configured to be placed in channel 204 after being compressed and trimmed using various manufacturing tools.

With reference to FIG. 5, an illustration of a composite ply is depicted in accordance with an illustrative embodiment. Composite ply 300 is shown in this figure prior to forming folded composite ply 301, as shown in FIG. 3. Composite ply 300 has been cut to a desired shape before folding occurs.

In this depicted example, composite ply 300 has fibers 302. Fibers 302 are unidirectional fibers in this illustrative example. In other words, all of fibers 302 are oriented in the same direction.

The angle of orientation of fibers 302 is more clearly seen in this view. As shown, fibers 302 have an orientation at an angle relative to centerline 502 of composite ply 300. In this illustrative example, centerline 502 represents a central axis running longitudinally along composite ply 300 from one end to the opposite end. Composite ply 300 has a fiber orientation of about −45 degrees as shown.

As folded composite ply 301 is formed from composite ply 300, those unidirectional fibers 302 are folded on one another such that the plus-and-minus orientation of fibers 302 is achieved. Specifically, a +/−45 degree orientation of fibers 302 may be achieved in this illustrative example.

In this illustrative example, centerline 502 also represents first fold line 504 for composite ply 300. In this illustrative example, a "fold line" is a line about which composite ply 300 is folded. In this illustrative example, first fold line 504 represents the line about which a first fold in composite ply 300 is made.

Second fold lines 506 are also shown. Second fold lines 506 represent the lines about which a second fold in composite ply 300 is made. Composite ply 300 will be folded in a series of centerline folds during the manufacturing process depicted in FIGS. 5-8.

In other illustrative examples, composite ply 300 may be folded differently to form folded composite ply 301. For instance, composite ply 300 may be folded to have an accordion configuration in some illustrative examples.

Figure 6:
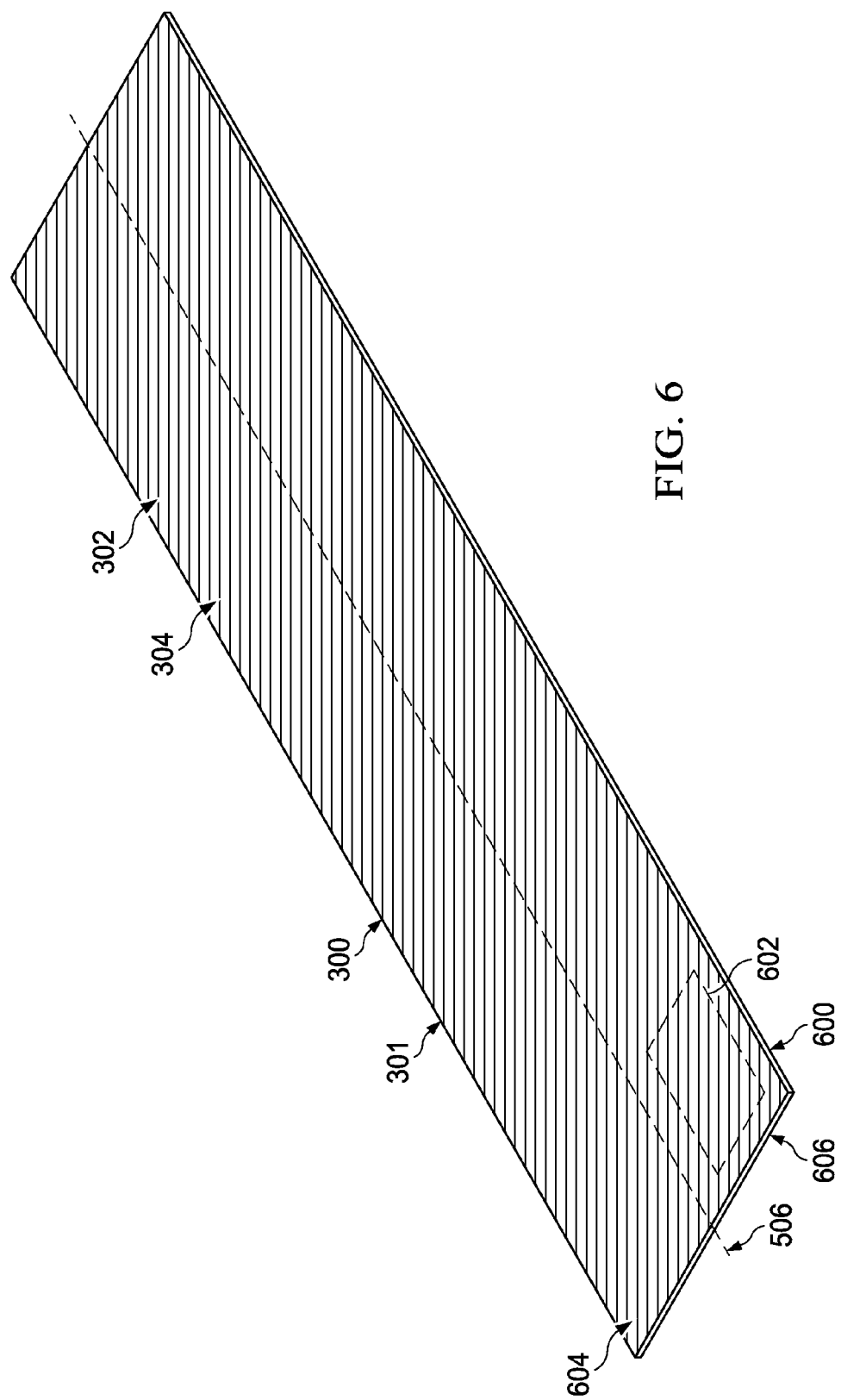
FIG. 6 is an illustration of a composite ply folded along a first fold line in accordance with an illustrative embodiment.

Turning next to FIG. 6, an illustration of a composite ply folded along a first fold line is depicted in accordance with an illustrative embodiment. In this depicted example, composite ply 300 has been folded along centerline 502 shown in FIG. 5.

Composite ply 300 now has layers 600. Layers 600 alternate between positive ply angle fibers 308 and negative ply angle fibers 310 from FIG. 3 to form the plus-and-minus, or bidirectional, orientation of fibers 302. A portion of layers 600 is shown in section 602.

In this illustrative example, layers 600 include first layer 604 and second layer 606. First layer 604 is folded on top of second layer 606 in this illustrative example.

Figure 7:
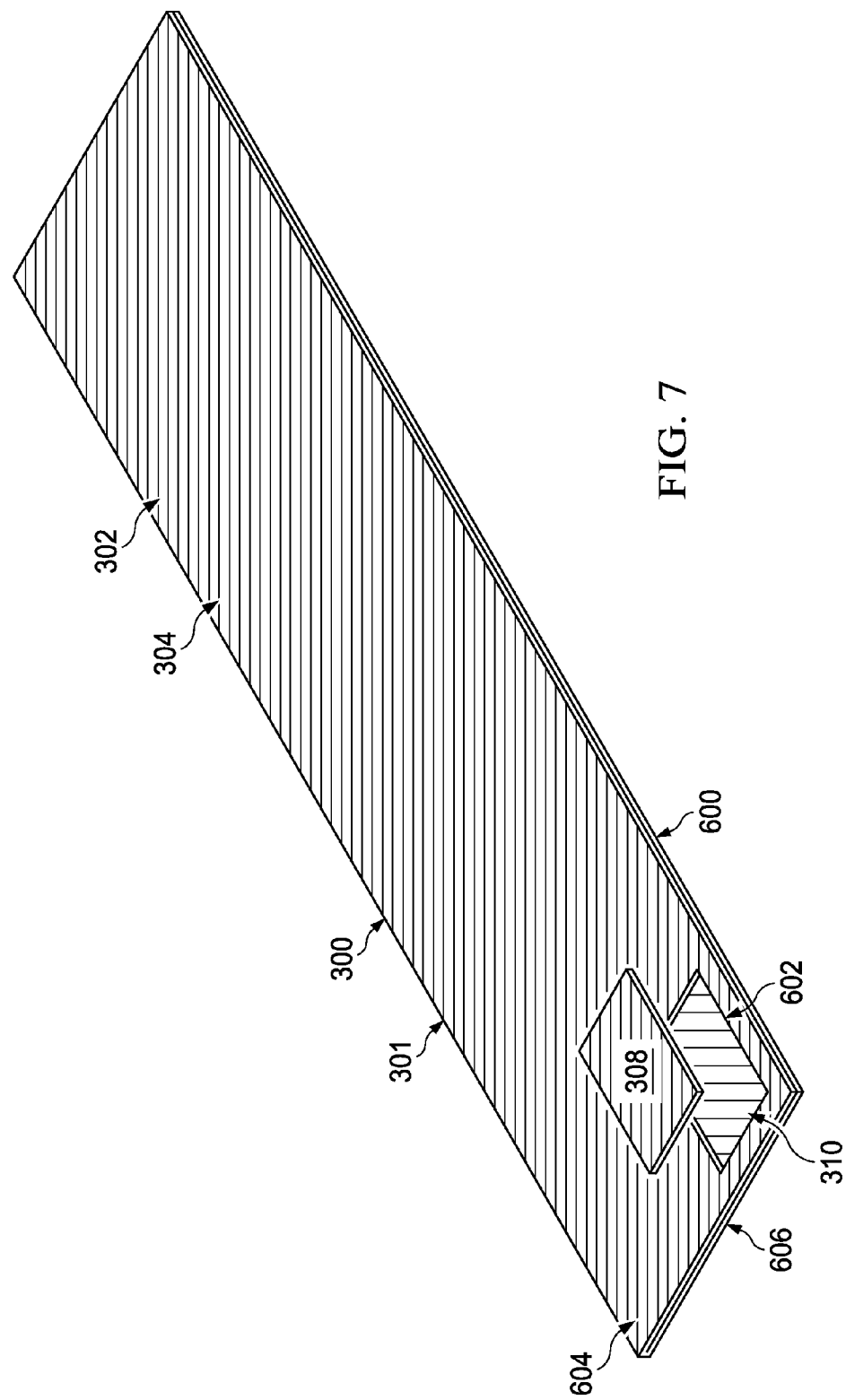
FIG. 7 is an illustration of an exploded view of a section of layers of a composite ply in accordance with an illustrative embodiment.

In FIG. 7, an illustration of an exploded view of a section of layers of a composite ply is depicted in accordance with an illustrative embodiment. In this illustrative example, first layer 604 of composite ply 300 within section 602 is shown in an exploded view.

As depicted, fibers 302 alternate between positive ply angle fibers 308 and negative ply angle fibers 310. Specifically, first layer 604 has positive ply angle fibers 308 while second layer 606 has negative ply angle fibers 310.

As the folding of composite ply 300 continues, each layer will have the opposite orientation of fibers 302. Because composite ply 300 is folded on itself, the thickness of each of layers 600 may be uniformly controlled. In addition, because each of layers 600 comprises substantially the same materials with the same characteristics, structural performance of folded composite ply 301 may be more easily determined as compared to a composite stack with layers comprising different types of materials.

For example, each of layers 600 has the same coefficient of thermal expansion. This coefficient of thermal expansion may be matched with the composite material used to form stringer 200 and skin panel 207. As a result, the behavior of the materials is similar under varying environmental conditions, further enhancing the structural performance of composite filler 202. In other words, the composite material used for composite filler 202, stringer 200, and skin panel 207 may expand and contract at the same rate, therefore reducing stresses in these materials.

Additionally, because each of layers 600 only has unidirectional fibers, each of layers 600 may be thinner than some currently used composite fillers. In this manner, the out of plane stresses on the material may be reduced. As a result, the spread of an inconsistency, the formation of an inconsistency, or both may be reduced.

Figure 8:
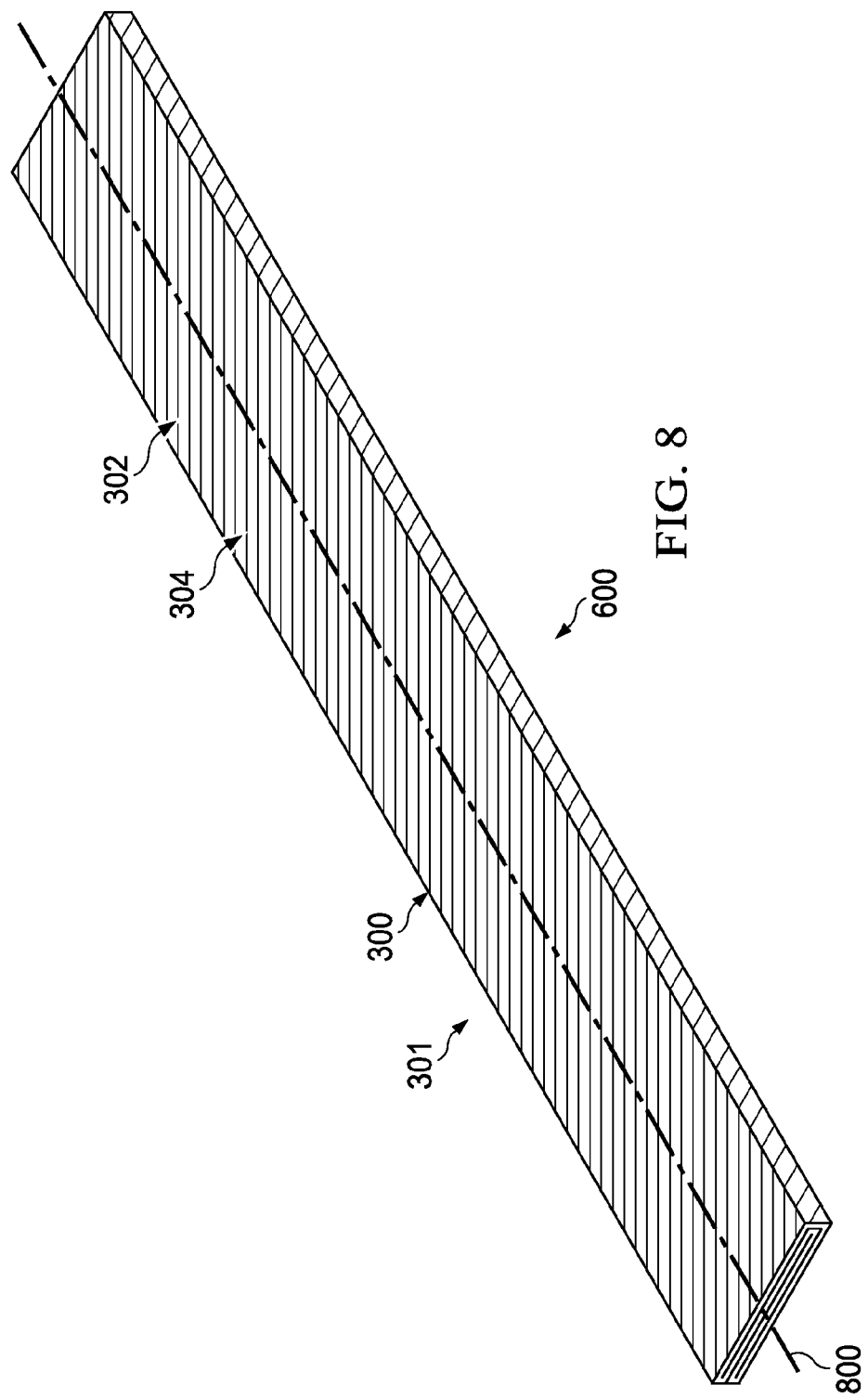
FIG. 8 is an illustration of a composite ply folded along a second fold line in accordance with an illustrative embodiment.

Referring to FIG. 8, an illustration of a composite ply folded along a second fold line is depicted in accordance with an illustrative embodiment. As shown, composite ply 300 has been folded along second fold lines 506 shown in FIGS. 5-6.

As shown, composite ply 300 now has four layers in layers 600. Layers 600 alternate between positive ply angle fibers 308 and negative ply angle fibers 310 shown in FIG. 3 and FIG. 7 to form the plus-and-minus orientation of fibers 302.

In this illustrative example, third fold line 800 is shown. Composite ply 300 may be folded along third fold line 800 in some illustrative examples. A number of additional folds may be made to composite ply 300 to form the plus-and-minus fiber orientation along length 400 of folded composite ply 301 as shown in FIG. 4.

Figure 9:
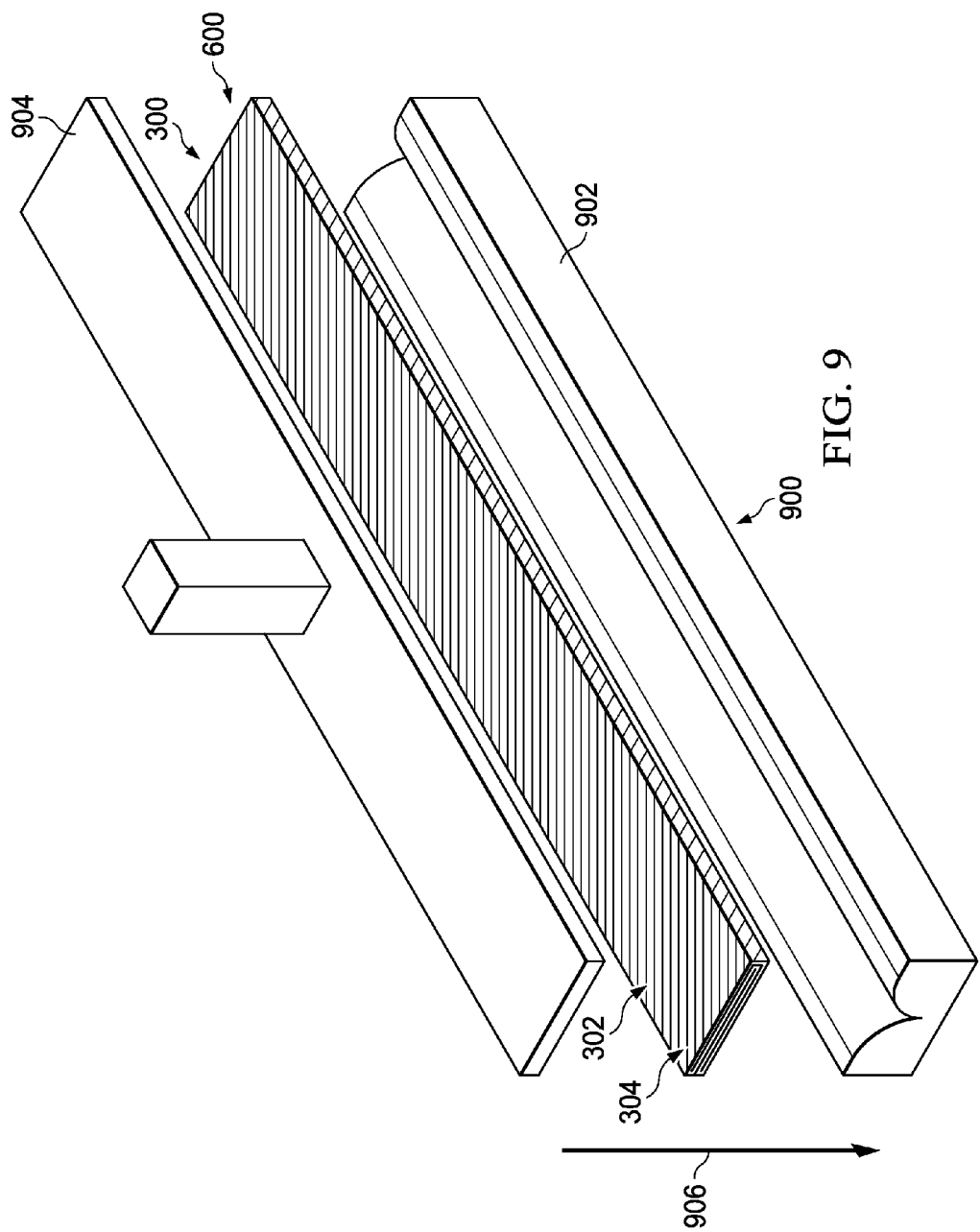
FIG. 9 is an illustration of a shape forming system for manufacturing a composite filler in accordance with an illustrative embodiment.

With reference now to FIG. 9, an illustration of a shape forming system for manufacturing a composite filler is depicted in accordance with an illustrative embodiment. In this illustrative example, manufacturing system 900 is shown.

As illustrated, manufacturing system 900 includes mold 902 and plate 904. Mold 902 and plate 904 form the shape of channel 204 shown in FIGS. 2-3.

Folded composite ply 301 is positioned in mold 902. A force is applied in the direction of arrow 906 to compress folded composite ply 301 in a desired manner to form composite filler 202. Once compressed, composite filler 202 may be trimmed to fit into channel 204.

Subsequent to trimming, composite filler 202 may be co-cured with a number of composite structures. For instance, composite filler 202 may be co-cured with at least one of stringer 200 or skin panel 207 in FIG. 2. When objects are co-cured, those objects are hardened at substantially the same time by exposure to a desired temperature and pressure.

In some illustrative examples, composite filler 202 may be co-bonded with a number of composite structures. For example, composite filler 202 may be co-bonded with at least one of stringer 200 or skin panel 207. In the case of co-bonding, composite filler 202 may be attached to an already cured structure. Alternatively, composite filler 202 may be cured first and then co-bonded with an uncured composite structure.

In some cases, a base charge or adhesive may be used between composite filler 202 and the surrounding composite structures. Further, composite filler 202 and the surrounding structures may be attached in some other manner, depending on the particular implementation.

Manufacturing system 900, as shown in this figure, is only one example of an implementation for a system configured to form composite filler 202. A die punch or some other system also may be used. A manual system, an automated system, or some combination thereof may be employed.

Figure 10:
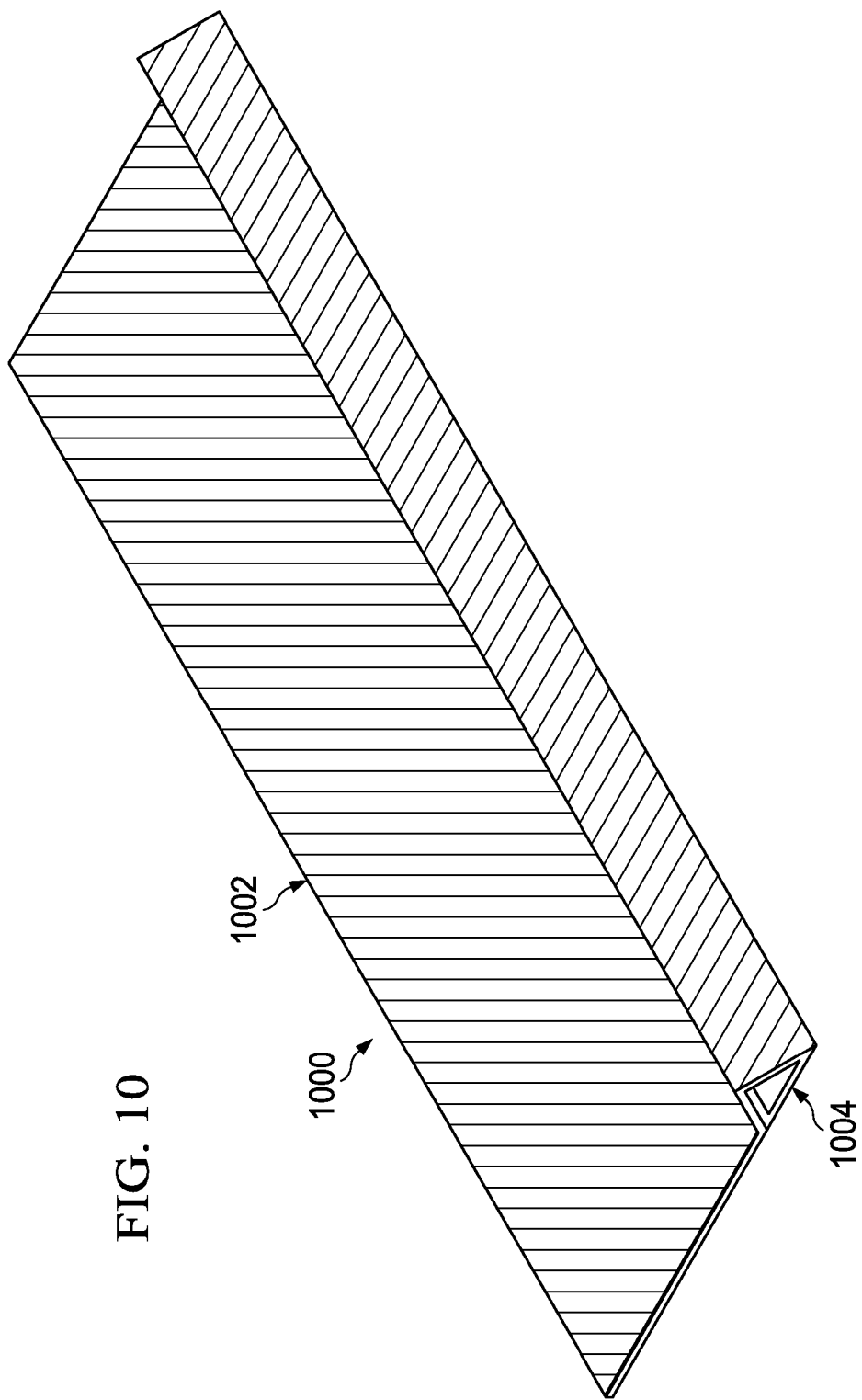
FIGS. 10-11 are illustrations that illustrate another process for folding a composite ply in accordance with an illustrative embodiment.
Figure 11:
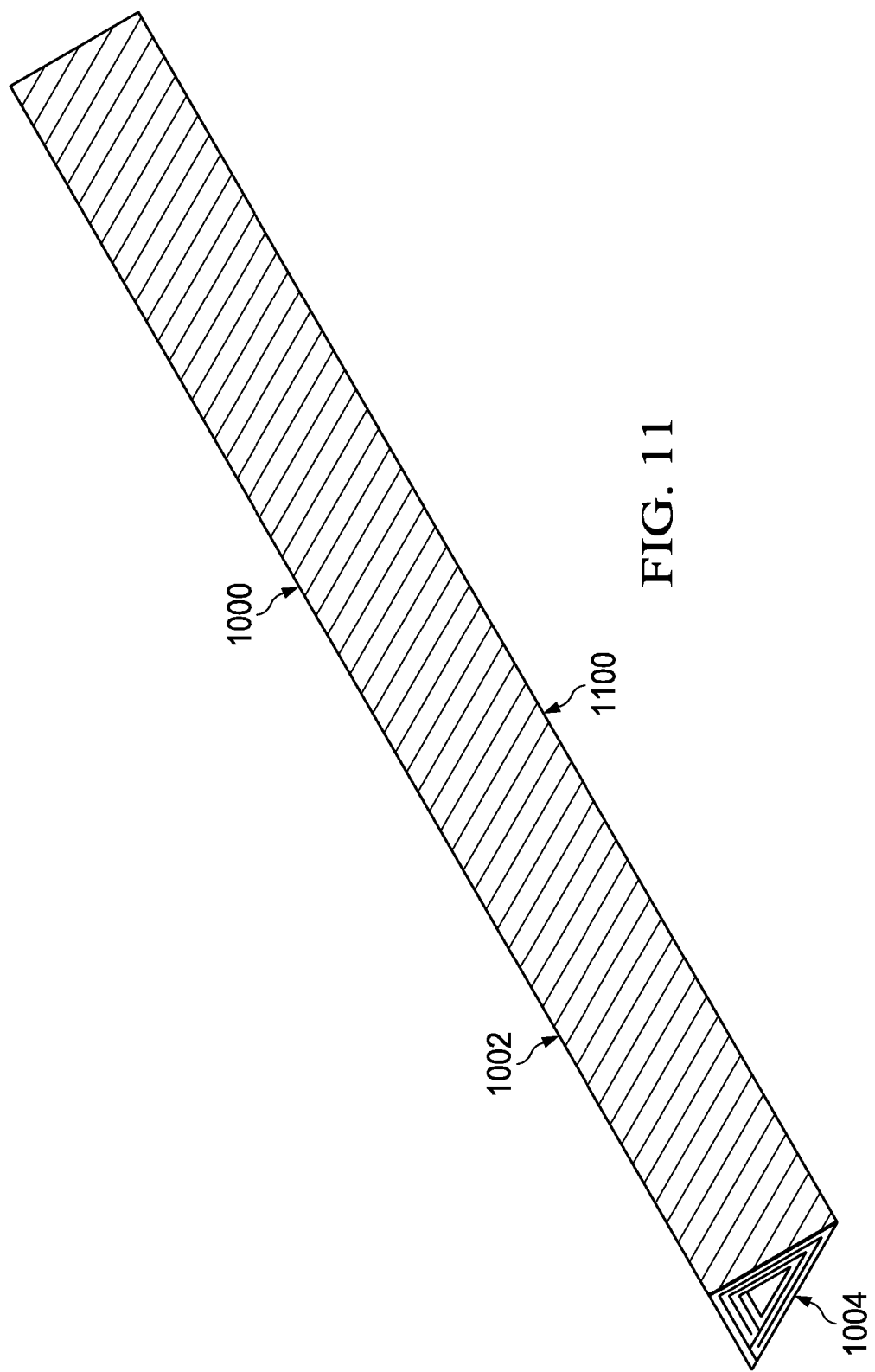

FIGS. 10-11 illustrate another process for folding a composite ply in accordance with an illustrative embodiment. In FIG. 10, composite ply 1000 includes fibers 1002. Fibers 1002 are unidirectional fibers in this illustrative example.

As depicted, composite ply 1000 is folded back and forth from one side to the other. Small folds are made such that the layers 1004 of composite ply 1000 have a plus-and-minus orientation of fibers 1002 as desired.

Turning to FIG. 11, folded composite ply 1100 has been formed from composite ply 1000. Folded composite ply 1100 has a shape similar to that of channel 204 shown in FIGS. 2-3. In this illustrative example, folded composite ply 1100 still may be compressed using manufacturing system 900 shown in FIG. 9 to form a composite filler.

Although two methods of folding a composite ply are shown in FIGS. 5-11, other methods may be used to form a folded composite ply in accordance with an illustrative embodiment. For instance, the composite ply may be rolled, or folded in some other manner, to achieve the desired orientation of fibers.

Figure 12:
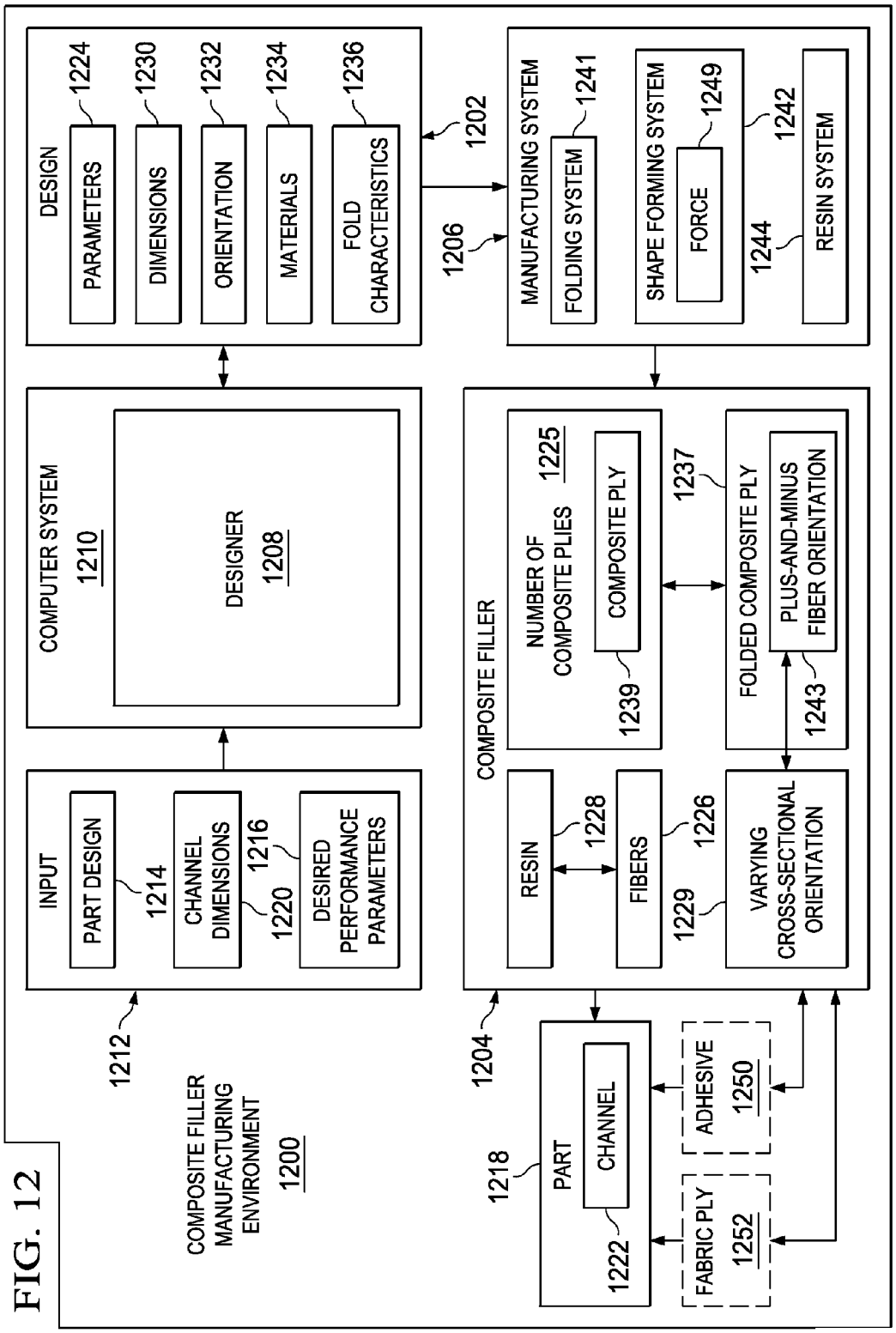
FIG. 12 is an illustration of a block diagram of a composite filler manufacturing environment in accordance with an illustrative embodiment.

Turning next to FIG. 12, an illustration of a block diagram of a composite filler manufacturing environment is depicted in accordance with an illustrative embodiment. In this illustrative example, composite filler manufacturing environment 1200 is depicted in block form to illustrate different components for one or more illustrative embodiments that may be used to manufacture composite fillers and parts with composite fillers.

In this illustrative example, design 1202 may be generated for composite filler 1204. Design 1202 may be, for example, a computer-aided design model or some other model that may be used to control manufacturing system 1206 to fabricate composite filler 1204. In this illustrative example, design 1202 may be generated using designer 1208.

Designer 1208 may be implemented in software, hardware, firmware or a combination thereof. When software is used, the operations performed by designer 1208 may be implemented in program code configured to run on a processor unit. When firmware is used, the operations performed by designer 1208 may be implemented in program code and data and stored in persistent memory to run on a processor unit. When hardware is employed, the hardware may include circuits that operate to perform the operations in designer 1208.

In the illustrative examples, the hardware may take the form of a circuit system, an integrated circuit, an application specific integrated circuit (ASIC), a programmable logic device, or some other suitable type of hardware configured to perform a number of operations.

With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, designer 1208 may be implemented in computer system 1210. Computer system 1210 may be one or more computers. When more than one computer is present in computer system 1210, those computers may communicate with each other using a communications media such as a network.

In the illustrative example, design 1202 for composite filler 1204 is generated using input 1212. Input 1212 may include, for example, part design 1214, desired performance parameters 1216, and other suitable types of input. Input 1212 may originate from various sources. For example, input 1212 may be received from at least one of a file, a human operator, a computer-aided design, a specification, or some other suitable source.

In the illustrative example, part design 1214 may be a computer-aided design model of part 1218 in which composite filler 1204 is to be used. Part 1218 may be selected from one of, for example, a composite part, a stringer, wing stringer, a T-shaped stringer, a horizontal stabilizer, a winglet, a wing box, an I-beam, a stiffener, a wing, or some other suitable part.

In the illustrative example, part design 1214 may include channel dimensions 1220 for part 1218 in which composite filler 1204 is to be located. Channel dimensions 1220 may include, for example, at least one of cross-sectional shapes, diameter, length, or other suitable parameters that may be used to describe channel 1222 in part 1218 in which composite filler 1204 is to be located.

Desired performance parameters 1216 are for the performance of composite filler 1204 in part 1218. In this illustrative example, desired performance parameters 1216 may be selected from at least one of a load, a coefficient of thermal expansion, toughness, fracture resistance, stiffness, strength, or other suitable performance parameters that may be desirable for composite filler 1204. For example, a coefficient of thermal expansion may be selected to minimize through-thickness stresses. Through-thickness stresses, as illustrated by arrows 324 shown in FIG. 3, may be stresses in the direction out of plane to the ply.

With input 1212, designer 1208 generates design 1202. For example, designer 1208 may generate parameters 1224 for composite filler 1204. As depicted, parameters 1224 may be selected for each ply in number of composite plies 1225. Specifically, parameters 1224 may be selected for fibers 1226 and resin 1228 in each ply in number of composite plies 1225 in composite filler 1204. For example, parameters 1224 may include at least one of dimensions 1230, orientation 1232, materials 1234, fold characteristics 1236, or other suitable parameters.

Parameters 1224 may be selected such that composite filler 1204 has a varying cross-sectional orientation 1229 of fibers 1226. As an example, parameters 1224 may result in composite filler 1204 having a cross-sectional orientation in which each layer has a different orientation of fibers 1226.

Further, parameters 1224 may include dimensions 1230 of each composite ply to be folded. As another example, parameters 1224 may include orientation 1232 for fibers 1226 in each ply.

In the illustrative example, dimensions 1230 and orientation 1232 for each composite ply may provide reinforcement in all three axes once the composite ply is folded. This type of reinforcement may result in a reduction in the formation of inconsistencies in at least one of composite filler 1204 or part 1218.

The toughness of materials 1234 for fibers 1226 also may result in a reduction in the formation of inconsistencies. The reduction in the propagation of an inconsistency also may be realized through the design of composite filler 1204 using fibers 1226.

In the illustrative examples, materials 1234 may be used to describe materials used or at least one of fibers 1226 or resin 1228. For example, materials 1234 for fibers 1226 may be selected from at least one of a metal, a metal alloy, carbon fiber, or some other suitable material. Materials 1234 for resin 1228 may be selected from one of a thermoplastic polymer, a thermoset polymer, an epoxy, a bis-maleimide resin, a polyamide, polyurethane, plastic, a metal, a polyester resin, a shape memory polymer (SMP) resin, and other suitable materials.

In an illustrative example, fold characteristics 1236 may describe the number of folds, location of folds, type of folds, angle of folds, or other suitable fold characteristics of each composite ply. For example, fold characteristics 1236 may indicate that folded composite ply 1237 may be formed from five centerline folds of a single ply of composite prepreg tape.

In another illustrative example, fold characteristics 1236 may indicate that composite ply 1239 should be folded to have an accordion configuration. When more than one composite ply is folded to form composite filler 1204, fold characteristics 1236 may be the same or different between plies.

In the illustrative example, manufacturing system 1206 may use design 1202 to manufacture composite filler 1204. Additionally, manufacturing system 1206 also may manufacture part 1218 including composite filler 1204.

Manufacturing system 1206 may include a number of different types of components. For example, manufacturing system 1206 may include folding system 1241, shape forming system 1242, and resin system 1244. In this illustrative example, folding system 1241, shape forming system 1242, and resin system 1244 may include various devices. These devices may be computer-controlled or operated by a human operator.

As depicted, folding system 1241 includes various components used to fold number of composite plies 1225. For example, folding system 1241 may be a mechanical device configured to manipulate composite ply 1239 to form folded composite ply 1237 with plus-and-minus fiber orientation 1243. In another illustrative example, folding system 1241 may be a human operator that manually folds composite ply 1239.

As illustrated, shape forming system 1242 may be a system used to compress folded composite ply 1237. In this illustrative example, shape forming system 1242 may be a press, a die punch, or other device. Shape forming system 1242 applies force 1249 to compress folded composite ply 1237.

Resin system 1244 is configured to place resin 1228 into fibers 1226 of composite filler 1204. In these illustrative examples, resin system 1244 may be selected from at least one of a resin injection system, a resin infusion system, or some other suitable type of system that places resin 1228 into fibers 1226. In some cases, when composite ply 1239 is a composite prepreg tape, resin system 1244 is used to preimpregnate composite ply 1239.

In the illustrative example, resin 1228 may be in different states. For example, resin 1228 may be in a state selected from one of a cured state, a partially cured state, and an uncured state within fibers 1226 to form composite filler 1204. Composite filler 1204 may be bonded within channel 1222 of part 1218, co-cured with other components for part 1218, or assembled in other ways such that composite filler 1204 is located within part 1218 when part 1218 is completed to form a finished part ready for use.

In some cases, manufacturing system 1206 may include additional tools to cut number of composite plies 1225, trim composite filler 1204, bond components, cure components, or perform other processes. For example, manufacturing system 1206 may include devices for placement of adhesive 1250 on an outer surface of the composite filler 1204, devices for placement of fabric ply 1252 on an inner surface of channel 1222, or both. Manufacturing system 1206 also may include components configured to position composite filler 1204 in channel 1222.

The illustration of composite filler manufacturing environment 1200 in FIG. 12 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although composite filler 1204 has been described for part 1218 for use in aircraft, composite filler 1204 may be designed and used in parts other than those for aircraft. For example, part 1218 may be used in a platform such as, for example, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, a power plant, a bridge, a dam, a house, a manufacturing facility, a building, and other suitable platforms.

The different components shown in FIGS. 1-11 may be combined with components in FIG. 12, used with components in FIG. 12, or a combination of the two. Additionally, some of the components in FIGS. 1-11 may be illustrative examples of how components shown in block form in FIG. 12 can be implemented as physical structures.

Figure 13:
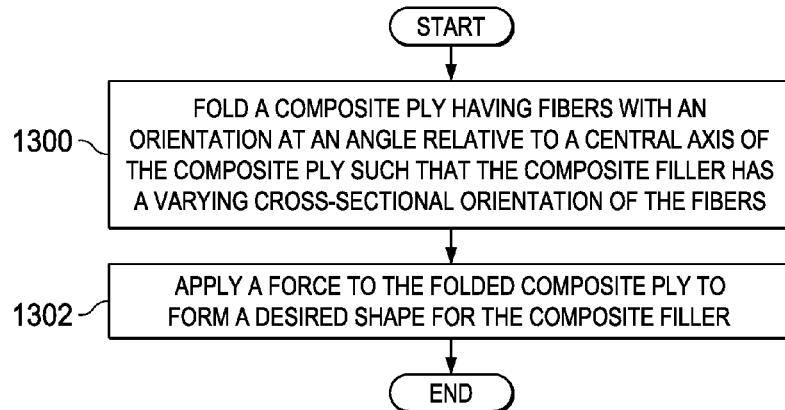
FIG. 13 is an illustration of a flowchart of a process for forming a composite filler in accordance with an illustrative embodiment.

With reference now to FIG. 13, an illustration of a flowchart of a process for forming a composite filler is depicted in accordance with an illustrative embodiment. The process illustrated in FIG. 13 may be implemented in composite filler manufacturing environment 1200 to form composite filler 1204 in FIG. 12.

The process begins by folding a composite ply having fibers with an orientation at an angle relative to a central axis of the composite ply such that the composite filler has a varying cross-sectional orientation of the fibers (operation 1300). Next, the process applies a force to the folded composite ply to form a desired shape for the composite filler (operation 1302), with the process terminating thereafter.

Figure 14:
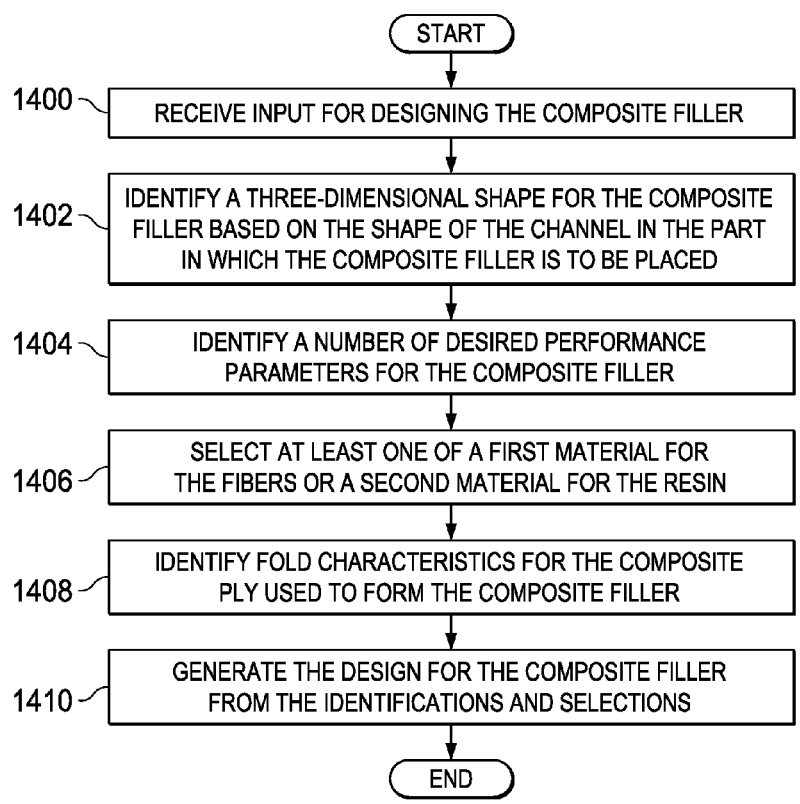
FIG. 14 is an illustration of a flowchart of a process for designing a composite filler in accordance with an illustrative embodiment.

Turning now to FIG. 14, an illustration of a flowchart of a process for designing a composite filler is depicted in accordance with an illustrative embodiment. The process illustrated in FIG. 14 may be used to generate a design for manufacturing composite filler 1204 shown in FIG. 12. The process in FIG. 14 may be implemented in designer 1208 in FIG. 12.

The process begins by receiving input for designing the composite filler (operation 1400). This input may include, for example, a part design, a number of desired performance parameters, and other suitable types of input.

Thereafter, the process identifies a three-dimensional shape for the composite filler based on the shape of the channel in the part in which the composite filler is to be placed (operation 1402). The shape of the channel may be identified from the part design received in the input.

The process identifies a number of desired performance parameters for the composite filler (operation 1404). The process then selects at least one of a first material for the fibers or a second material for the resin (operation 1406).

The process also identifies fold characteristics for the composite ply used to form the composite filler (operation 1408). The process then generates the design for the composite filler from the identifications and selections (operation 1410), with process terminating thereafter.

Figure 15:
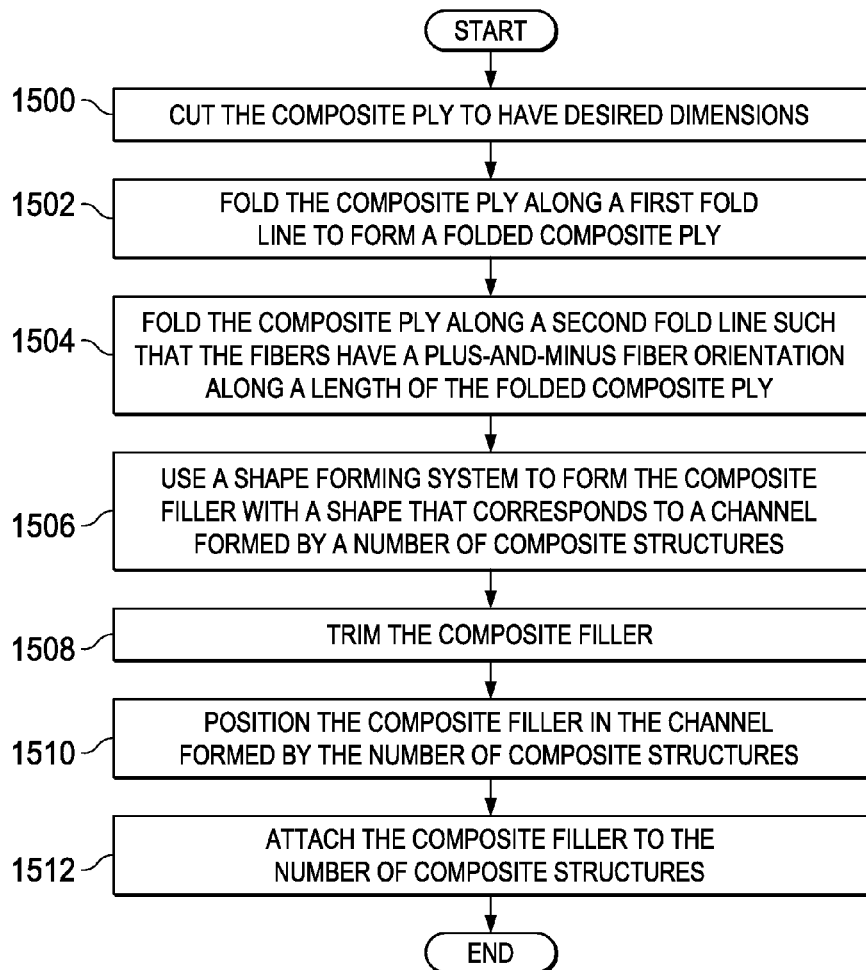
FIG. 15 is an illustration of a more detailed flowchart of a process for forming a composite filler in accordance with an illustrative embodiment.

Turning now to FIG. 15, an illustration of a more detailed flowchart of a process for forming a composite filler is depicted in accordance with an illustrative embodiment. The process illustrated in FIG. 15 may be implemented in composite filler manufacturing environment 1200 in FIG. 12.

The process begins by cutting the composite ply to have desired dimensions (operation 1500). Next, the process folds the composite ply along a first fold line to form a folded composite ply (operation 1502). In operation 1502, the first fold line may be located along the central axis, or centerline, of the composite ply.

Thereafter, the process folds the composite ply along a second fold line such that the fibers have a plus-and-minus fiber orientation along a length of the folded composite ply (operation 1504). A number of additional folds also may be formed, depending on the particular implementation.

The process then uses a shape forming system to form the composite filler with a shape that corresponds to a channel formed by a number of composite structures (operation 1506). Next, the process trims the composite filler (operation 1508).

The process then positions the composite filler in the channel formed by the number of composite structures (operation 1510). Optionally, an adhesive or base charge may be positioned between the composite filler and a composite structure.

The process then attaches the composite filler to the number of composite structures (operation 1512), with the process terminating thereafter. In operation 1512, the composite filler and the number of composite structures may be co-cured.

In other illustrative examples, the composite filler and at least one composite structure may be co-bonded. Additional steps, such as resin infusion or other processes, also may be performed in some illustrative examples.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of module, a segment, a function, or a portion a combination thereof of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 1600 as shown in FIG. 16 and aircraft 1700 as shown in FIG. 17. Turning first to FIG. 16, an illustration of an aircraft manufacturing and service method is depicted in the form of a block diagram in accordance with an illustrative embodiment. During pre-production, aircraft manufacturing and service method 1600 may include specification and design 1602 of aircraft 1700 in FIG. 17 and material procurement 1604.

During production, component and subassembly manufacturing 1606 and system integration 1608 of aircraft 1700 in FIG. 17 takes place. Thereafter, aircraft 1700 in FIG. 17 may go through certification and delivery 1610 in order to be placed in service 1612. While in service 1612 by a customer, aircraft 1700 in FIG. 17 is scheduled for routine maintenance and service 1614, which may include modification, reconfiguration, refurbishment, and other maintenance or service.

Each of the processes of aircraft manufacturing and service method 1600 may be performed or carried out by a system integrator, a third party, an operator, or a combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft is depicted in the form of a block diagram in which an illustrative embodiment may be implemented. In this example, aircraft 1700 is produced by aircraft manufacturing and service method 1600 in FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1600 in FIG. 16. In particular, composite filler 1204 from FIG. 12 may be installed in a composite part in aircraft 1700 during any one of the stages of aircraft manufacturing and service method 1600. For example, a composite part may be manufactured in accordance with an illustrative embodiment during component and subassembly manufacturing 1606, during maintenance and service 1614, or some other time. For example, a composite part may be manufactured during specification and design 1602 is a prototype for testing to determine whether particular design is a desired design for a composite part.

In one illustrative example, components or subassemblies produced in component and subassembly manufacturing 1606 in FIG. 16 may be fabricated or manufactured in a manner similar to components or subassemblies produced while aircraft 1700 is in service 1612 in FIG. 16. As yet another example, one or more apparatus embodiments, method embodiments, or a combination thereof may be utilized during production stages, such as component and subassembly manufacturing 1606 and system integration 1608 in FIG. 16. One or more apparatus embodiments, method embodiments, or a combination thereof may be utilized while aircraft 1700 is in service 1612, during maintenance and service 1614 in FIG. 16, or a combination thereof. The use of a number of the different illustrative embodiments may substantially expedite the assembly, reduce the cost of aircraft 1700, or both.

Thus, the illustrative embodiments provide a method and apparatus for forming composite filler 1204 for use in composite structures. Composite ply 1239 is folded. Composite ply 1239 comprises fibers 1226 with orientation 1232 at an angle relative to a central axis of composite ply 1239 such that composite filler 1204 has varying cross-sectional orientation 1229 of fibers 1226. Force 1249 is applied to composite ply 1239 to form a desired shape for composite filler 1204.

With the use of an illustrative embodiment, the spread of an inconsistency in a composite filler may be reduced or eliminated. In an illustrative embodiment, a single composite ply may be folded to form a composite filler with desired strength characteristics.

The composite filler may be designed with a coefficient of thermal expansion that reduces stresses in the out-of-plane-to-ply direction. The composite ply is folded on itself to reduce the thickness between layers. A smaller through-thickness distance significantly improves the thermal performance of the composite filler.

With a composite filler manufactured in accordance with an illustrative embodiment, the manufacturing process is kept simple and inexpensive by using only a single ply of material pulled from a roll and folded several times prior to being compressed into a final shape. The size of the composite filler can also be varied down the length by narrowing or widening the material ply.

The combination of a reduced through-thickness distance resulting in low coefficient of thermal expansion induced stress, as well as the multi-axis ply orientation, produces a thermally resilient and crack resistant composite filler. Due to the decreased manufacturing time and material expense, significant cost savings may be realized with the use of an illustrative embodiment. Precise stacking of plies is eliminated. Simply folding a single composite ply results in desired structural and thermal expansion characteristics.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for forming a composite filler in a desired shape, the method comprising:
    preparing a composite ply having a rectangular shape with a first side across from a third side and a second side across from a fourth side, the composite ply comprising a resin and a plurality of fibers;
    folding the composite ply along at least one fold line parallel with a central axis of the composite ply to form at least a first part of the composite ply adjacent a second part of the composite ply, thus forming a folded composite ply;
    wherein the central axis extends in a straight line continuously between a first midpoint of the first side and a second midpoint of the third side;
    wherein all of the plurality of fibers in the composite ply extend diagonally, continuously, and parallel to each other, in a straight line, wherein a first portion of the fibers extend continuously from the first side to the second side, a second portion of fibers extend from the fourth side to the third side, and a third portion of fibers extend from the fourth side to the second side both before and after folding; and
    applying a force to the folded composite ply to form the composite filler in the desired shape;
    wherein the composite filler is formed in the desired shape only from the folded composite ply.

2. The method of claim 1 further comprising:
    positioning the composite filler in a channel formed by a number of composite structures.

3. The method of claim 2 further comprising:
    co-curing the composite filler and the number of composite structures.

4. The method of claim 2 further comprising:
    positioning an adhesive on an outer surface of the composite filler before positioning the composite filler in the channel.

5. The method of claim 2 further comprising:
    positioning a fabric ply on an inner surface of the channel prior to positioning the composite filler.

6. The method of claim 2, wherein a wall of the channel is curved.

7. The method of claim 2, wherein walls of the channel define a substantially triangular shape.

8. The method of claim 2, wherein the channel is formed by a stringer and a skin panel.

9. The method of claim 8, wherein the channel extends centrally through the stringer along an axis.

10. The method of claim 1, wherein the central axis extends in a straight line continuously between a first midpoint of the first side and a second midpoint of the second side; and
    wherein an orientation of the fibers relative to the central axis of the composite ply is selected from one of +/−10 degrees, +/−15 degrees, +/−30 degrees, +/−45 degrees, +/−60 degrees, and +/−75 degrees.

11. The method of claim 1, wherein folding the composite ply comprises:
    folding the composite ply along a first fold line to form a folded composite ply, wherein the first fold line is located along the central axis of the composite ply; and
    folding the composite ply along a second fold line such that the fibers have a plus-and-minus fiber orientation along a length of the folded composite ply.

12. The method of claim 1 further comprising:
    cutting the composite ply to have desired dimensions prior to folding the composite ply.

13. The method of claim 1, wherein the composite ply is a single ply of composite prepreg tape.

14. The method of claim 1, wherein the composite ply is a first composite ply and further comprising:
    a second composite ply, wherein the first composite ply and the second composite ply form a two-ply stack of composite prepreg tape creating a plus-and-minus fiber orientation when folded.

15. A method for forming a composite filler in a desired shape, the method comprising:
    cutting a composite ply to have a rectangular shape with a first side across from a third side and a second side across from a fourth side, wherein the composite ply is a ply of composite prepreg tape comprising fibers;
    folding the composite ply along a fold line parallel with a central axis of the composite ply to form at least a first layer of the composite ply adjacent a second layer of the composite ply, thus forming a folded composite ply having at least two adjacent layers;
    wherein all of the fibers in the composite ply extend diagonally, continuously, and parallel to each other, in a straight line, wherein a first portion of the fibers extend continuously from the first side to the second side, a second portion of fibers extend from the fourth side to the third side, and a third portion of fibers extend from the fourth side to the second side both before and after folding;

wherein the composite ply has a first side across from a second side and a third side across from a fourth side;

wherein the central axis extends in a straight line continuously between a first midpoint of the first side and a second midpoint of the third side;

applying a force to the folded composite ply the composite filler in the desired shape, wherein the composite filler is formed in the desired shape only from the folded composite ply;

positioning the composite filler in a channel formed by a number of composite structures; and attaching the composite filler to the number of composite structures.

16. The method of claim 15, wherein attaching the composite filler to the number of composite structures comprises:

co-curing the composite filler with the number of composite structures.

17. The method of claim 15, wherein attaching the composite filler to the number of composite structures comprises:

co-bonding the composite filler with the number of composite structures.

18. The method of claim 15, wherein the composite ply is a first composite ply and further comprising:

a second composite ply, wherein the first composite ply and the second composite ply comprise a two-ply stack of composite prepreg tape creating a plus-and-minus fiber orientation when folded.

19. The method of claim 15, wherein the channel is formed by a stringer and a skin panel.

20. The method of claim 15, wherein walls of the channel define a substantially triangular shape.

* * * * *